(12) United States Patent
Shin et al.

(10) Patent No.: US 10,263,232 B2
(45) Date of Patent: Apr. 16, 2019

(54) NONAQUEOUS ELECTROLYTE SECONDARY BATTERY SEPARATOR HEATING DEVICE AND NONAQUEOUS ELECTROLYTE SECONDARY BATTERY SEPARATOR PRODUCTION METHOD

(71) Applicant: Sumitomo Chemical Company, Limited, Tokyo (JP)

(72) Inventors: Akihiko Shin, Daegu (KR); Koichiro Watanabe, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 7 days.

(21) Appl. No.: 15/353,808

(22) Filed: Nov. 17, 2016

(65) Prior Publication Data

US 2017/0145558 A1    May 25, 2017

(30) Foreign Application Priority Data

Nov. 20, 2015   (JP) .................................. 2015-227977
Nov. 14, 2016   (JP) .................................. 2016-221660

(51) Int. Cl.
*B05D 5/12*      (2006.01)
*H01M 2/14*      (2006.01)
(Continued)

(52) U.S. Cl.
CPC ......... *H01M 2/145* (2013.01); *H01M 2/1653* (2013.01); *H01M 2/1686* (2013.01); *H01M 10/0525* (2013.01)

(58) Field of Classification Search
CPC .......................... C23C 14/5806; H01M 10/60
See application file for complete search history.

(56) References Cited

U.S. PATENT DOCUMENTS 5,935,884 A *   8/1999   Williams ............... D21H 13/26
                                                    162/146
6,250,376 B1 *  6/2001   Hendrix .................. D21F 5/028
                                                     165/89
(Continued)

FOREIGN PATENT DOCUMENTS

CN      103168209 A    6/2013
CN      104512033 A    4/2015
(Continued)

OTHER PUBLICATIONS

Office Action dated Jan. 25, 2018 in CN Application No. 201611020257.9.

(Continued)

*Primary Examiner* — Austin Murata
(74) *Attorney, Agent, or Firm* — Panitch Schwarze Belisario & Nadel LLP

(57) ABSTRACT

A drying device includes a first cylindrical member and a second cylindrical member. The first cylindrical member has an outer peripheral surface having a surface temperature that is higher on one width wise side where an end is present than on the other widthwise side where another end is present, whereas the second cylindrical member has an outer peripheral surface having a surface temperature that is lower on the one widthwise side where an end is present than on the other widthwise side where another end is present.

20 Claims, 9 Drawing Sheets

(51) Int. Cl.
*H01M 2/16* (2006.01)
*H01M 10/0525* (2010.01)

(56) References Cited

U.S. PATENT DOCUMENTS

| | | |
|---|---|---|
| 2003/0051662 A1 | 3/2003 | Lee et al. |
| 2003/0168759 A1 | 9/2003 | Ho et al. |
| 2004/0089654 A1* | 5/2004 | Kitano ............... F28D 15/02 219/601 |
| 2007/0138162 A1* | 6/2007 | Tonomura ............ F28F 5/02 219/469 |
| 2009/0297649 A1 | 12/2009 | Sano et al. |
| 2010/0119639 A1 | 5/2010 | Sano et al. |
| 2011/0142468 A1* | 6/2011 | Fujikura ........... G03G 15/2053 399/67 |

FOREIGN PATENT DOCUMENTS

| | | |
|---|---|---|
| CN | 204503498 U | 7/2015 |
| JP | 2003266542 A | 9/2003 |
| JP | 2007-168222 A | 7/2007 |
| JP | 2009248421 A | 10/2009 |
| JP | 2013-223947 A | 10/2013 |
| KR | 20090079991 A | 7/2009 |
| KR | 20090123811 A | 12/2009 |
| KR | 20100067859 A | 6/2010 |

OTHER PUBLICATIONS

Office Action dated Mar. 22, 2017 in KR Application No. 10-2016-0153887.

* cited by examiner

NONAQUEOUS ELECTROLYTE SECONDARY BATTERY SEPARATOR HEATING DEVICE AND NONAQUEOUS ELECTROLYTE SECONDARY BATTERY SEPARATOR PRODUCTION METHOD

CROSS-REFERENCE TO RELATED APPLICATION

This Non-provisional application claims priority under 35 U.S.C. § 119 to Japanese Patent Application Nos. 2015-227977, filed in Japan on Nov. 20, 2015, and 2016-221660, filed in Japan on Nov. 14, 2016, the entire contents of which are hereby incorporated by reference.

TECHNICAL FIELD

The present invention relates to a film beating device including a cylindrical member for heating a film wrapped on an outer peripheral surface of the cylindrical member and a film production method using the film heating device.

BACKGROUND

Conventionally, a film drying device used in a film production process is a film drying device in which a film is dried by putting the film in contact with art outer peripheral surface of a heated cylindrical roller.

In association with the above-described technique, there is a known drying roller device in which a heating medium fluid is circulated inside a cylindrical member, so that a sheet-like heat-treatment target object in contact with an outer peripheral surface of the cylindrical member is heated to a predetermined temperature to dry (Patent Literature 1). In the drying roller device, the heating medium fluid is provided for the purpose of making the temperature of the outer peripheral surface of the cylindrical member uniform, which cylindrical member constitutes a main body of a drying roller. This heating medium fluid is caused to flow into the cylindrical member through a flow path, which is provided through a core cylinder located in a space formed inside the cylindrical member, and then to flow out of the cylindrical member after passing through another flow path between an inner peripheral wall of the cylindrical member and an outer peripheral wall of the core cylinder.

Meanwhile, there is a drying roller device that heats a film wrapped, in such a manner that a certain level of tension on the film is maintained, around outer peripheral surfaces of a plurality of cylindrical members through each of which a heating medium is caused to flow helically (Patent Literature 2). This device is provided with ducts in a multiple helical arrangement inside each of the cylindrical members so that the heating medium may pass through one end surface to the other end surface of the cylindrical member. Then, a film is put in contact with the outer peripheral surfaces of the plurality of cylindrical members, so that a certain level of tension on the film will foe maintained.

CITATION LIST

Patent Literature

[Patent Literature 1] Japanese Patent Application Publication, Tokukai, No. 2007-168222 (Publication Date: Jul. 5, 2007) (FIGS. 1 through 4, and paragraphs [0003] and [0004])

[Patent Literature 2] Japanese Patent Application Publication, Tokukai, No. 2013-223947 (Publication Date: Oct. 31, 2013) (FIGS. 1 through 3, and 5, and paragraphs [0004], [0005], [0019] and [0022])

SUMMARY OF INVENTION

Technical Problem

The above-described conventional technique, however, has a problem in that: it is difficult to uniformly dry a film wrapped on an outer peripheral surface of a cylindrical member because the outer peripheral surface has a thermal distribution that is not uniform.

For example, in a configuration according to Patent Literature 1, the core cylinder that forms the flow path is provided so as to reach one end-surface side of the cylindrical member, so that the heating medium fluid discharged in a hot state from the flow path is supplied, on the one end-surface side, to the inner peripheral wall of the cylindrical member. This excessively increases a temperature of the inner peripheral wall on the one end-surface side. Consequently, the peripheral surface of the cylindrical member has a thermal distribution that is not uniform in a width direction of the cylindrical member.

Meanwhile, in a configuration according to Patent Literature 2, the outer peripheral surface of each of the plurality of cylindrical members cannot have a thermal distribution that is completely uniform. Further, the cylindrical members each have the same thermal distribution that is not uniform in a width direction of the cylindrical member. Consequently, an amount of given heat varies more along a width direction of a film, as the number of cylindrical members with which the film is caused to come in contact increases.

An embodiment of the present invention is attained in view of the above conventional problems. An object of an embodiment of the present invention is to provide a film heating device and a film production method each of which can make it possible to nearly uniformly heat a film.

Solution to Problem

In order to solve the above problem, a film heating device in accordance with an embodiment of the present invention includes: a first cylindrical member; and a second cylindrical member, the first cylindrical member and the second cylindrical member each causing a heating medium to flow inside the first cylindrical member or the second cylindrical member, so as to heat a film wrapped on an outer peripheral surface of the first cylindrical member or the second cylindrical member, the first cylindrical member and the second cylindrical member being provided along a transfer direction of the film so as to be substantially identical in width direction, the first cylindrical member having an outer peripheral surface and two first ends in the width direction, the outer peripheral surface having a higher surface temperature on one first-end side that is a side corresponding to one end of the first cylindrical member in the width direction, than on the other first-end side that is another side corresponding to the other end of the first cylindrical member in the width direction, and the second cylindrical member having an outer peripheral surface and two second ends in the width direction, the outer peripheral surface having a lower surface temperature on one second-end side that is the side corresponding to the one end of the second cylindrical member in the width direction, than on the other second-end side that is the another side corresponding to the other end of the second cylindrical member in the width direction.

In order to solve the above problem, a film heating device in accordance with an embodiment of the present invention includes: a first cylindrical member; and a second cylindrical member, the first cylindrical member and the second cylindrical member each causing a heating medium to flow inside the first cylindrical member or the second cylindrical member, so as to heat a film wrapped on an outer peripheral surface of the first cylindrical member or the second cylindrical member, the first cylindrical member and the second cylindrical member being provided along a transfer direction of the film so as to be substantially identical in width direction, the first cylindrical member being supplied with the heating medium from a side corresponding to one end of the first cylindrical member in the width direction, and the second cylindrical member having two ends which include one end on the side corresponding to the one end of the first cylindrical member in the width direction and the other end on another side opposite to the one side in the width direction, the second cylindrical member being supplied with the heating medium from the another side corresponding to the other end.

In order to solve the above problem, a film production method in accordance with an embodiment of the present invention includes the step of heating a film by use of a first cylindrical member and a second cylindrical member, each of which causes a heating medium to flow inside the first cylindrical member or the second cylindrical member so as to heat the film wrapped on an outer peripheral surface of the first cylindrical member or the second cylindrical member, the first cylindrical member and the second cylindrical member being provided so as to be substantially identical in width direction, the heating step including: a first sub-step of wrapping the film on the outer peripheral surface of the first cylindrical member, which has a higher surface temperature on one first-end side that is a side corresponding to one end of the first cylindrical member in the width direction, than on another first-end side that is another side corresponding to the other end of the first cylindrical member in the width direction; and a second sub-step of wrapping the film on the outer peripheral surface of the second cylindrical member, the second cylindrical member having two ends which include one end on the side corresponding to the one end of the first cylindrical member in the width direction and the other end on the another side corresponding to the other end of the first cylindrical member in the width direction, the second cylindrical member having a lower surface temperature on one second-end side that is a side corresponding to the one end of the second cylindrical member in the width direction, than on another second-end side that is another side corresponding to the other end of the second cylindrical member in the width direction.

In order to solve the above problem, a film production method in accordance with an embodiment of the present invention includes the step of heating a film by use of a first cylindrical member and a second cylindrical member, each of which causes a heating medium to flow inside the first cylindrical member or the second cylindrical member so as to heat the film wrapped on an outer peripheral surface of the first cylindrical member or the second cylindrical member, the first cylindrical member and the second cylindrical member being provided so as to be substantially identical in width direction, the heating step including: a first sub-step of wrapping the film on the outer peripheral surface of the first cylindrical member, which is supplied with the heating medium from a side corresponding to one end of the first cylindrical member in the width direction; and a second sub-step of wrapping the film on the outer peripheral surface of the second cylindrical member, the second cylindrical member having two ends which include one end on the side corresponding to the one end of the first cylindrical member in the width direction and the other end on another side opposite to the one side in the width direction, the second cylindrical member being supplied with the heating medium from the another side corresponding to the other end.

Advantageous Effects of Invention

An embodiment of the present invention advantageously makes it possible to provide a film heating device capable of nearly uniformly heating a film and a film production method using the film heating device.

Figure 6:
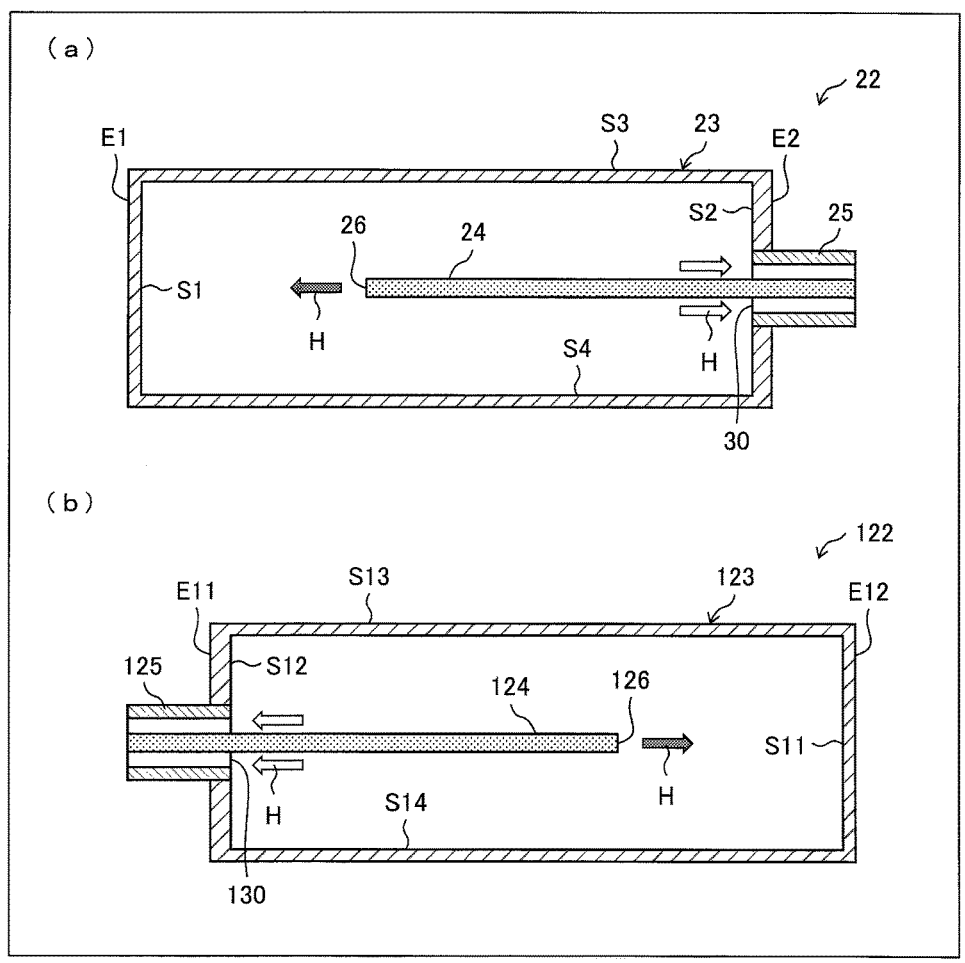

(a) of FIG. 6 is a schematic cross sectional view illustrating a configuration of a first drying roller provided in the drying device; and (b) of FIG. 6 is a schematic cross sectional view illustrating a configuration of a second drying roller provided in the drying device.

Figure 7:
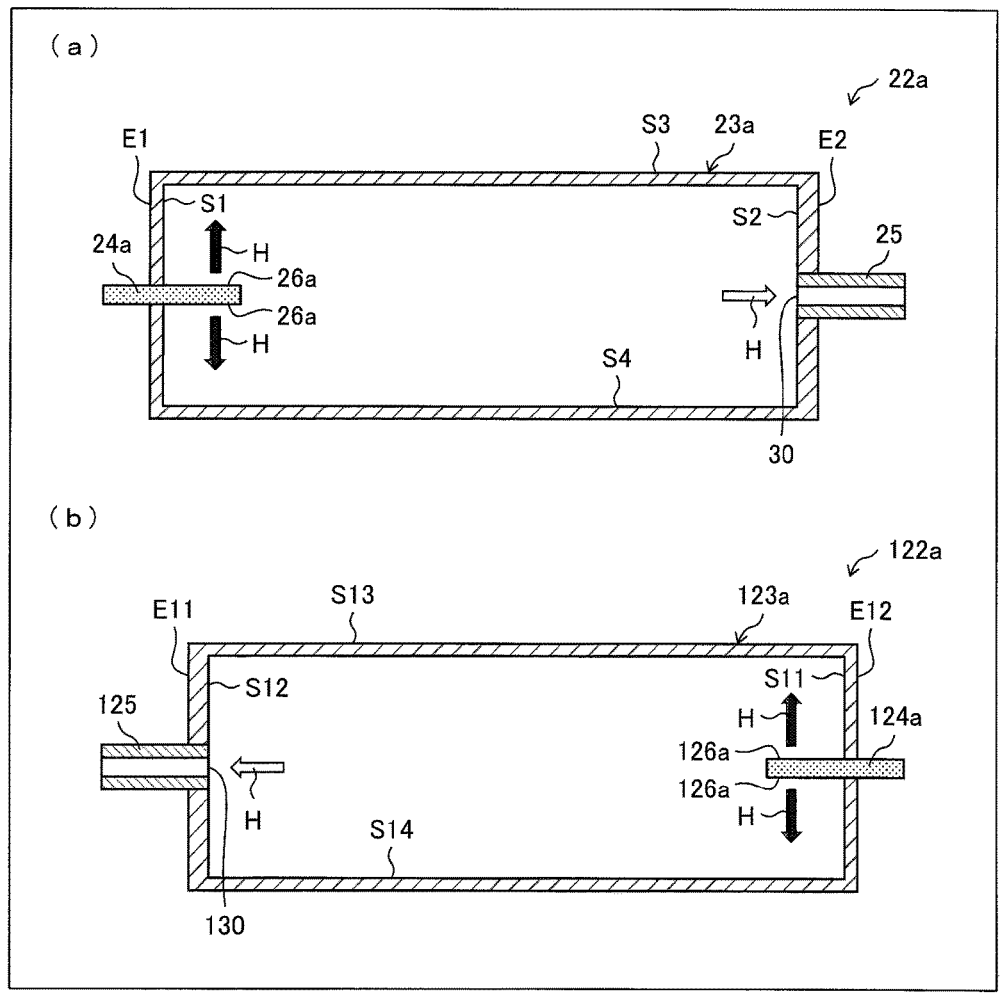

(a) of FIG. 7 is a schematic cross sectional view illustrating a configuration of a first drying roller provided in a drying device in accordance with Embodiment 2; and (b) of FIG. 7 is a schematic cross sectional view illustrating a configuration of a second drying roller provided in the drying device.

Figure 8:
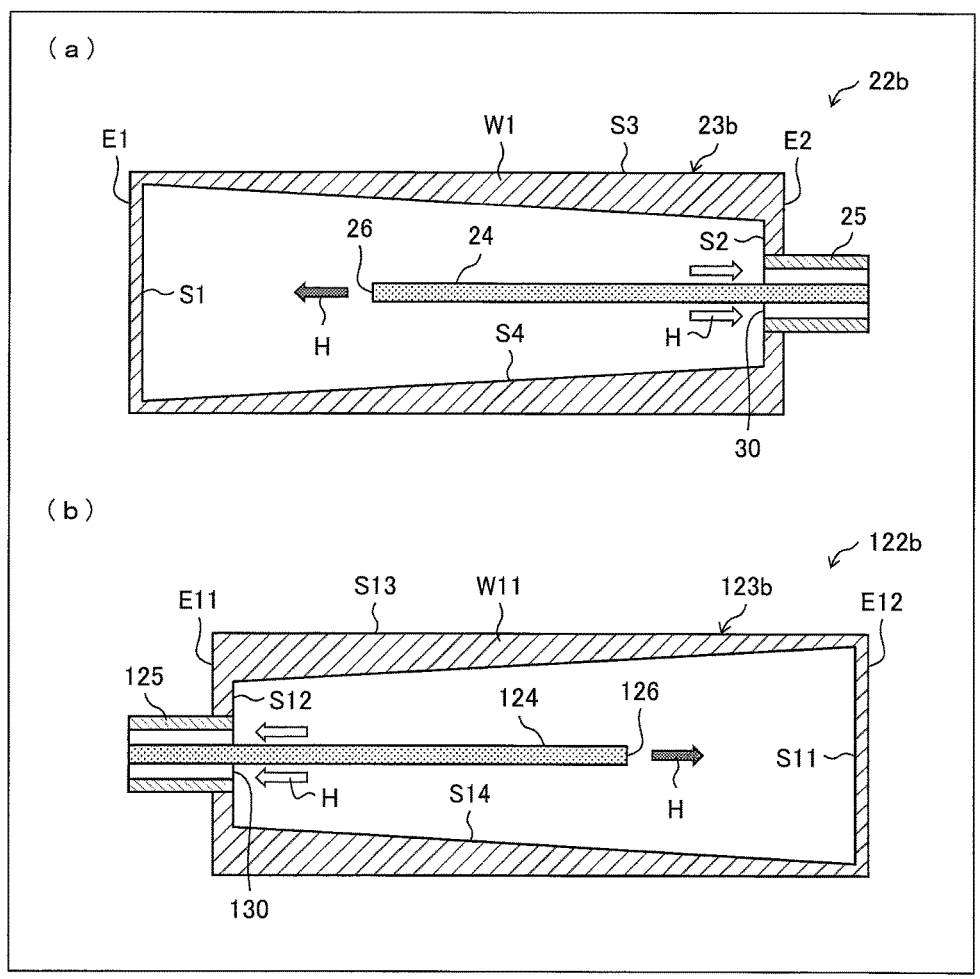

(a) of FIG. 8 is a schematic cross sectional view illustrating a configuration of a first drying roller provided in a drying device in accordance with Embodiment 3; and (b) of FIG. 8 is a schematic cross sectional view illustrating a configuration of a second drying roller provided in the drying device.

Figure 9:
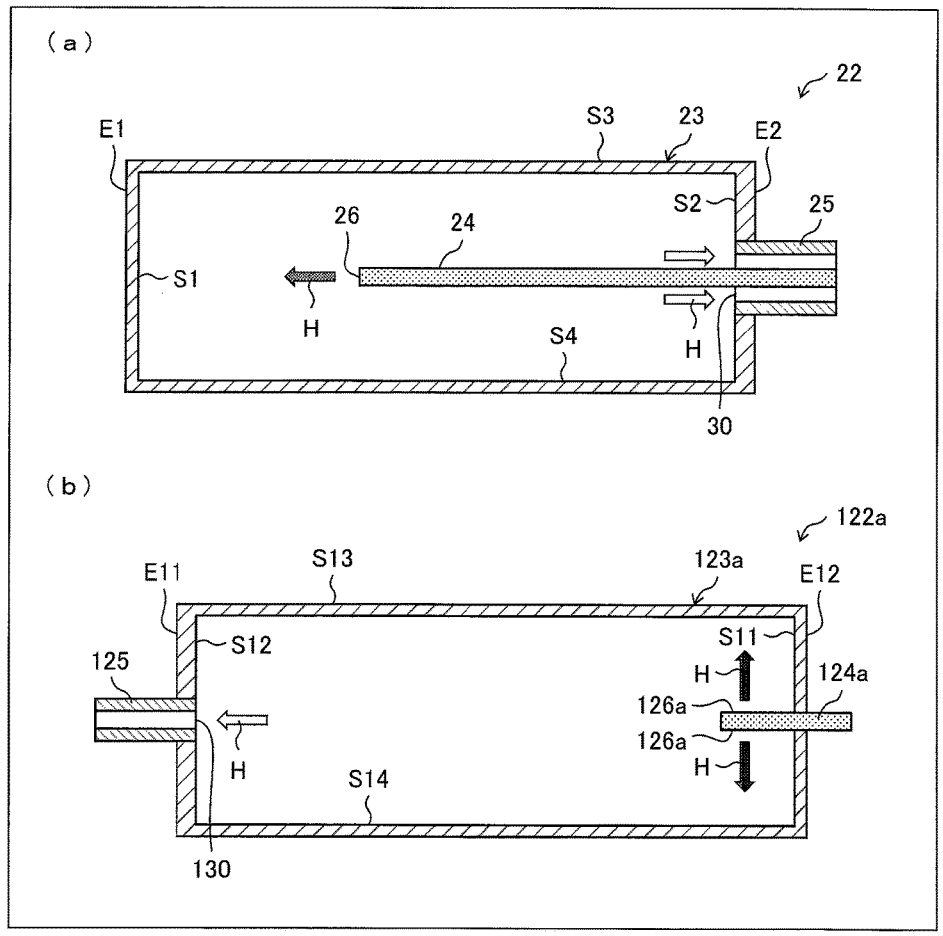

(a) of FIG. 9 is a schematic cross sectional view illustrating a configuration of a first drying roller provided in a drying device in accordance with Embodiment 4; and (b) of FIG. 9 is a schematic cross sectional view illustrating a configuration of a second drying roller provided in the drying device.

DESCRIPTION OF EMBODIMENTS

Embodiment 1

The following description will discuss, in order, a lithium-ion secondary battery, a separator for batteries, and a heat-resistant separator in accordance with Embodiment 1 of the present invention.

<Lithium-Ion Secondary Battery>

A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
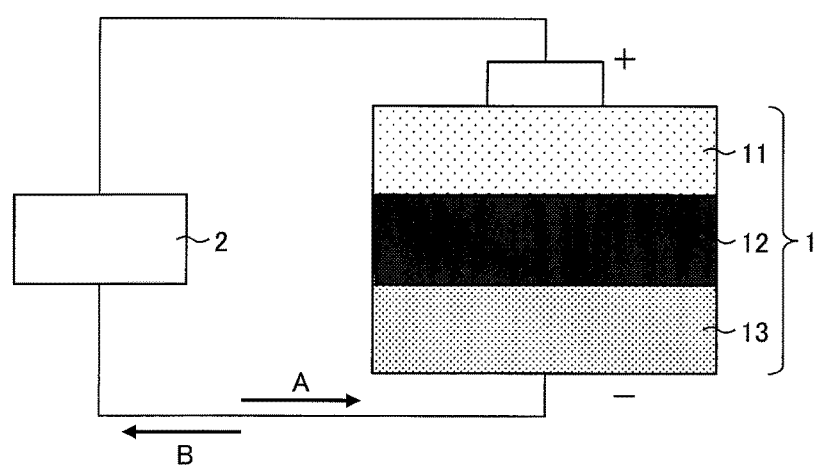
FIG. 1 is a schematic view illustrating a cross sectional configuration of a lithium-ion secondary battery in accordance with Embodiment 1.

FIG. 1 is a schematic view illustrating a cross sectional configuration of a lithium-ion secondary battery 1. As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

<Separator>

The separator 12 is provided so as to be sandwiched between the cathode 11 as a positive electrode of the lithium-ion secondary battery 1 and the anode 13 as a negative electrode of the lithium-ion secondary battery 1. The separator 12 is a porous film which separates the cathode 11 and the anode 13, allowing lithium ions to move between the cathode 11 and the anode 13. The separator 12 contains, for example, polyolefin such as polyethylene or polypropylene as a material.

Figure 2:
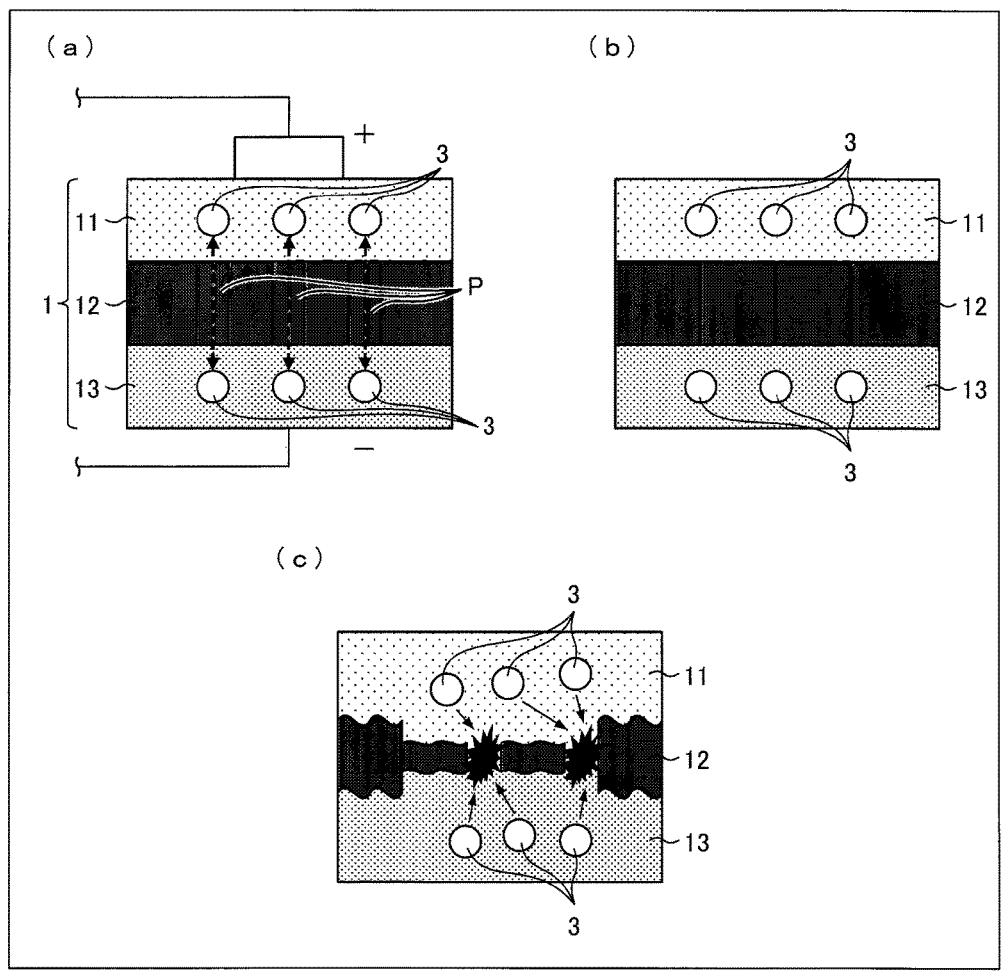
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens, and the pores P are blocked as illustrated in (b) of FIG. 2. As a result, the separator 12 shrinks. This stops the above back-and-forth movement of the lithium ions 3, and consequently stops the above temperature rise.

However, in a case where a temperature of the lithium-ion secondary battery 1 sharply rises, the separator suddenly shrinks. In this case, as illustrated in (c) of FIG. 2, the separator 12 may be broken. Then, the lithium ions 3 leak out from the separator 12 which has been broken. As a result, the lithium ions 3 do not stop moving back and forth. Consequently, the temperature continues rising.

<Heat-Resistant Separator>

Figure 3:
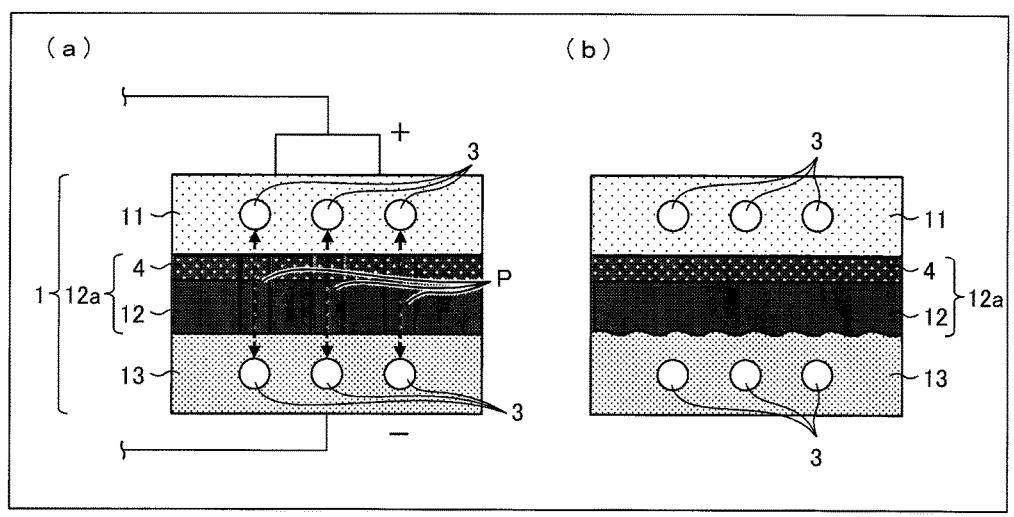
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen.

As illustrated in (a) of FIG. 3, the lithium-ion secondary battery 1 can further include a heat-resistant layer 4. The heat-resistant layer 4 and the separator 12 form a heat-resistant separator 12a (separator). The heat-resistant layer 4 is laminated on one surface of the separator 12 which surface is on a cathode 11 side. Note that the heat-resistant layer 4 can be alternatively laminated on the other surface of the separator 12 which surface is on an anode 13 side, or on both surfaces of the separator 12. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in (b) of FIG. 3, even in a case where the temperature of the lithium-ion secondary battery 1 sharply rises and accordingly the separator 12 melts or softens, the shape of the separator 12 is maintained because the heat-resistant Layer 4 supports the separator 12. Therefore, such a sharp temperature rise results in only melting or softening of the separator 12 and consequent blocking of the pores P. This stops back-and-forth movement of the lithium ions 3 and consequently stops the above-described excessive discharging or excessive charging. In this way, the separator 12 can be prevented from being broken.

<Production Steps of Heat-Resistant Separator Original Sheet (Separator Original Sheet)>

How to produce the heat-resistant separator 12a of the lithium-ion secondary battery 1 is not specifically limited. The heat-resistant separator 12a can be produced by a publicly-known method. The following discussion assumes a case where the separator 12 contains polyethylene as a main material. However, even in a case where the separator 12 contains another material, the similar steps can still be applied to production of the heat-resistant separator 12a.

For example, it is possible to employ a method including the steps of first forming a film by adding an inorganic filler or a plasticizer to a thermoplastic resin, and then removing the organic filler or the plasticizer with an appropriate solvent. For example, in a case where the separator 12 is a polyolefin separator made of a polyethylene resin containing ultra-high molecular weight polyethylene, it is possible to produce the separator 12 by the following method.

This method includes (1) a kneading step of obtaining a polyethylene resin composition by kneading a ultra-high molecular weight polyethylene with an inorganic filler (e.g., calcium carbonate, or silica) or plasticizer (e.g., low molecular weight polyolefin, or liquid paraffin), (2) a rolling step of forming a film with the polyethylene resin composition, (3) a removal step of removing the inorganic filler or the plasticizer from the film obtained in the step (2), and (4) a stretching step of obtaining the separator 12 by stretching the film obtained in the step (3). Note that the step (4) can be carried out between the steps (2) and (3).

In the removal step, many fine pores are provided in the film. The fine pores of the film stretched in the stretching step become the above-described pores P. The separator 12 thus formed is a polyethylene microporous film having a prescribed thickness and a prescribed air permeability.

Note that, in the kneading step, 100 parts by weight of the ultra-high molecular weight polyethylene, 5 parts by weight to 200 parts by weight of a low molecular weight polyolefin having a weight-average molecular weight of 10000 or less, and 100 parts by weight to 400 parts by weight of the inorganic filler can be kneaded.

Thereafter, in a coating step, the heat-resistant layer 4 is formed on a surface of the separator 12. For example, on the separator 12, an aramid/NMP (N-methylpyrrolidone) solution (coating solution) is applied, and thereby, the heat-resistant layer 4 that is an aramid heat-resistant layer is formed. The heat-resistant layer 4 can be provided on only one surface or both surfaces of the separator 12. Alternatively, the heat-resistant layer 4 can be formed by using, for coating, a mixed solution containing a filler such as alumina/carboxymethyl cellulose.

In the coating step, it is also possible to form an adhesive layer on a surface of the separator 12, by first applying, to the surface of the separator 12, a poly vinylidene fluoride/dimethylacetamide solution (coating solution) (application sub-step) and then solidifying the solution (solidification sub-step). Such an adhesive layer can be formed on only one surface or both surfaces of the separator 12.

A method of coating the separator 12 with a coating solution is not specifically limited as long as uniform wet coating can be performed by the method. The method can be a conventionally publicly-known method such as a capillary coating method, a slit die coating method, a spray coating method, a dip coating method, a roll coating method, a screen printing method, a flexo printing method, a bar coater method, a gravure coater method, or a die coater method. The heat-resistant layer 4 has a thickness which, can be controlled by adjusting a thickness of a coating wet film, a solid-content concentration represented by the sum of a binder concentration and a filler concentration in the coating solution, or a ratio of a filler a binder in the coating solution.

It is possible to use a resin film, a metal belt, a drum or the like as a support with which the separator 12 is fixed or transferred in coating.

<Configuration of Heat-Resistant Separator Original Sheet>

Figure 4:
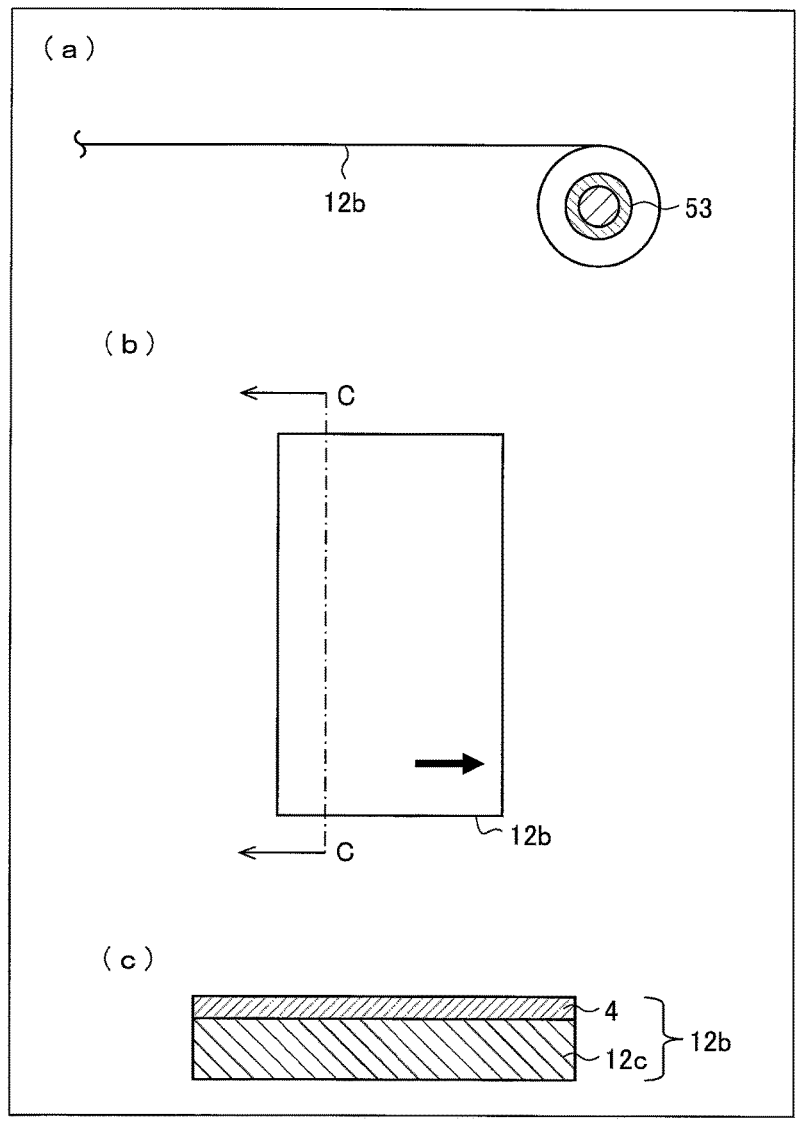
FIG. 4 is a view illustrating a heat-resistant separator original sheet, which is a separator original sheet having the above another configuration in which a heat-resistant layer is laminated.

FIG. 4 is a view illustrating an original sheet 12b (film) of a heat-resistant separator (hereinafter, referred to as a "heat-resistant separator original sheet 12b") in which the heat-resistant layer 4 is laminated on an original sheet 12c of a separator (hereinafter, referred to as a "separator original sheet 12c"). (a) of FIG. 4 illustrates a state in which the heat-resistant separator original sheet 12b is being wound; (b) of FIG. 4 is a plan view illustrating the heat-resistant separator original sheet 12b; and (c) of FIG. 4 is a cross sectional view taken along a plane CC in (b) of FIG. 4.

It is possible to produce a heat-resistant separator original sheet 12b (hereinafter, simply referred to as "separator original sheet 12b") which is a separator original sheet in which the heat-resistant layer 4 is laminated on the separator original sheet 12c in accordance with the above-described production method. The separator original sheet 12b thus produced is wound around a core 53 having a cylindrical shape (see (a) of FIG. 4). Note that an object to be produced by the above production method is not limited to the separator original sheet 12b. The above production method does not necessarily include the coating step. In a case where the method includes no coating step, the object to be produced is a separator original sheet 12c in which no heat-resistant layer 4 is laminated. Though the following discusses, as an example, the separator original sheet (film) 12b including, as a main functional layer, the heat-resistant layer 4, a similar process (steps) can be applied to a separator (film) having no functional layer and to a separator original sheet (original sheet of a film (hereinafter, referred to as a "film original sheet")).

<Configuration of Drying Device 21>

Figure 5:
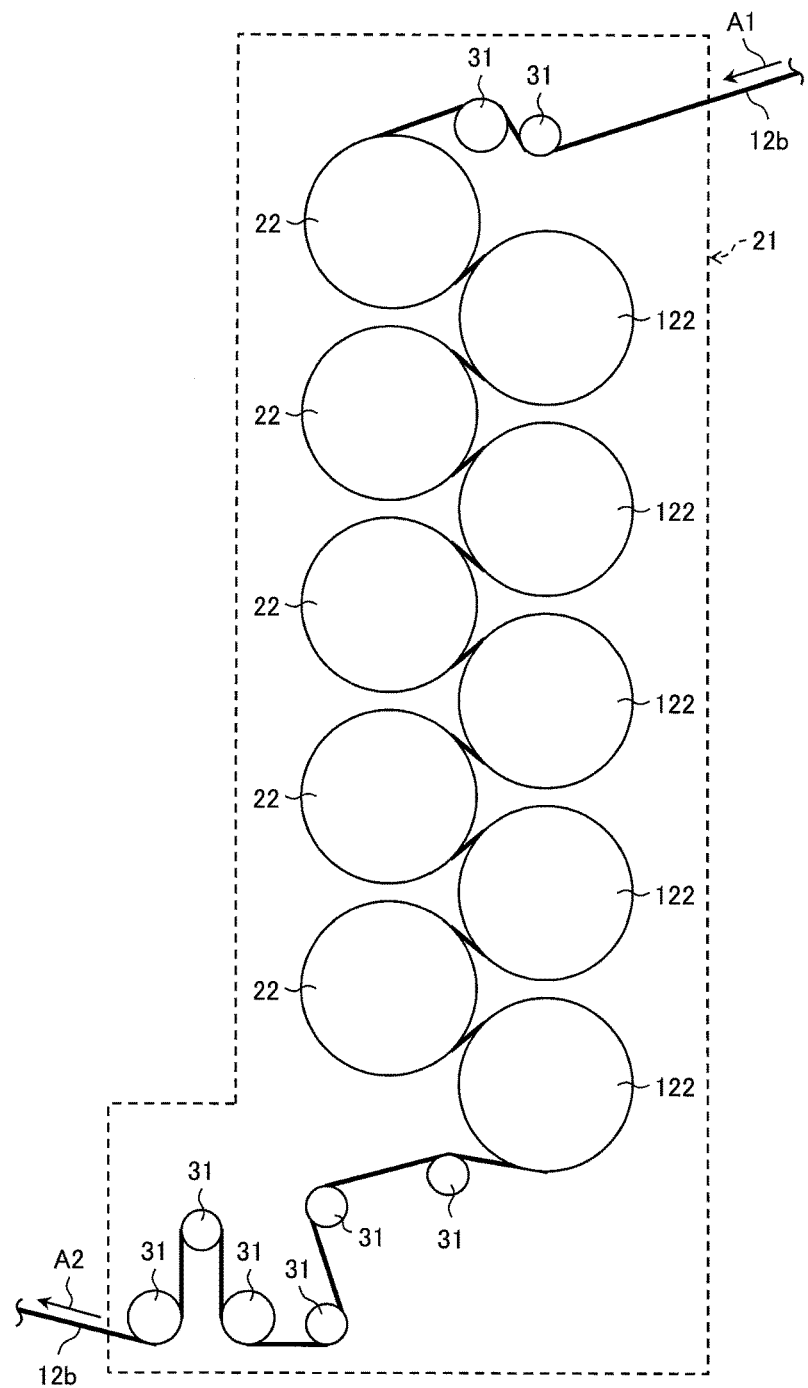
FIG. 5 is a schematic view illustrating a drying device for drying the heat-resistant separator original sheet.

FIG. 5 is a schematic view illustrating a configuration of a drying device 21 for drying the separator original sheet 12b. The drying device (film heating device) 21 heats and dries the separator original sheet 12b in which the separator original sheet 12c is coated with the heat-resistant layer 4. The separator original sheet 12b is fed into the drying device 21, in a direction indicated by an arrow A. The separator original sheet 12b is transferred by two transfer rollers 31.

Then, the separator original sheet 12b is further transferred by five first drying rollers 22 and five second drying rollers 122 provided alternately in two rows (i.e., left and right rows), while being wrapped alternately on a first drying roller 22 in the left row and a second drying roller 122 in the right row.

Then, the separator original sheet 12b thus dried is further transferred by six other transfer rollers 31, and ejected in a direction indicated by an arrow A2 from the drying device 21.

(a) of FIG. 6 is a schematic cross sectional view illustrating a configuration of the first drying roller 22 provided in the drying device 21; and (b) of FIG. 6 is a schematic cross sectional view illustrating a configuration of the second drying roller 122 provided in the drying device 21.

(First Drying Roller 22)

The first drying roller 22 includes a first cylindrical member 23. The first cylindrical member 23 has an outer peripheral surface S3, an inner peripheral surface S4, an inner end surface S1 on one end E1 (first-end) side, and an inner end surface S2 on the other end E2 (other first-end) side that is opposite to the one end E1 side.

The inside of the first cylindrical member 23 is filled with hot water H (heating medium). The separator original sheet 12b is wrapped on the outer peripheral surface S3 and transferred.

The first cylindrical member 23 is provided with a cylindrical outlet pipe 25 on the other end E2 side. Further, the first cylindrical member 23 is provided with a cylindrical discharge pipe 24 on the other end E2 side. This cylindrical discharge pipe 24 is provided through the outlet pipe 25 and inserted into the first cylindrical member 23. The first cylindrical member 23 is further provided with an outlet 30 for ejecting the hot water H, between an inner peripheral surface of the outlet pipe 25 and an outer peripheral surface of the discharge pipe 24.

The discharge pipe 24 has a linear tubular shape whose diameter is smaller than that of the outlet 30. This makes assembly work for inserting the discharge pipe 24 into the first cylindrical member 23 through the outlet 30 uncomplicated and simple.

This discharge pipe 24 extends so as to reach the vicinity of the inner end surface S1 of the first cylindrical member 23, and has a discharge opening 26 sit a tip of the discharge pipe 24. The hot water H discharged through the discharge opening 26 of the discharge pipe 24 toward the inner end surface S1 flows along the inner peripheral surface S4 toward an inner-end-surface S2 side from an inner-end-surface S1 side. Further, the hot water H discharged in a hot state through the discharge opening 26 gradually decreases in temperature, before the hot water H moving along the inner peripheral surface S4 from the inner-end-surface S1 side reaches the inner end surface S2. Accordingly, the outer peripheral surface S3 of the first cylindrical member 23 has a relatively high surface temperature on the one end E1 side, and a relatively low temperature on the other end E2 side.

Note that the surface temperature of the outer peripheral surface S3 on the one end E1 side is defined as, for example, an average temperature of temperatures measured at six positions located at equal intervals along a circumferential direction on an edge portion of the outer peripheral surface S3, which edge portion is at an edge, on the one end E1 side, of a contact region where the outer peripheral surface S3 is in contact with the separator original sheet 12b during drying. Further, the surface temperature of the outer peripheral surface S3 on the other end E2 side is defined as, for example, an average temperature of temperatures measured at six positions located at equal intervals along the circumferential direction on an edge portion of the outer peripheral surface S3, which edge portion is at an edge, on the other end E2 side, of the contact region.

(Second Drying Roller 122)

The second drying roller 122 includes a second cylindrical member 123. The second cylindrical member 123 has an outer peripheral surface S13, an inner peripheral surface S14, an inner end surface S12 on one end E11 (second end) side, and an inner end surface S11 on the other end E12 (other second-end) side that is opposite to the one end E11 side.

The inside of the second cylindrical member 123 is filled with hot water H (heating medium). The separator original sheet 12b is wrapped on the outer peripheral surface S13 and transferred.

The second cylindrical member 123 is provided with a cylindrical outlet pipe 125 on the one end E11 side. Further, the second cylindrical member 123 is provided with a cylindrical discharge pipe 124 on the one end E11 side. This cylindrical discharge pipe 124 is provided through the outlet pipe 125 and inserted into the second cylindrical member 123. The second cylindrical member 123 is further provided with an outlet 130 for ejecting the hot water H, between an inner peripheral surface of the outlet pipe 125 and an outer peripheral surface of the discharge pipe 124.

The discharge pipe 124 has a linear tubular shape whose diameter is smaller than that of the outlet 130. This makes assembly work for inserting the discharge pipe 214 into the first cylindrical member 123 through the outlet 130 uncomplicated and simple.

This discharge pipe 124 extends so as to reach the vicinity of the inner end surface S11 of the second cylindrical member 123, and has a discharge opening 126 at a tip of the discharge pipe 124. The hot water H discharged through the discharge opening 126 of the discharge pipe 124 toward the inner end surface S11 flows along the inner peripheral surface S14 toward an inner-end-surface S12 side from an inner-end-surface S11 side. Further, the hot water H discharged in a hot state through the discharge opening 126 gradually decreases in temperature, before the hot water H moving along the inner peripheral surface S14 from the inner-end-surface S11 side reaches the inner end surface S12. Accordingly, the outer peripheral surface S13 of the second cylindrical member 123 has a relatively low surface temperature on the one end E11 side, and a relatively high temperature on the other end E12 side.

Note that the surface temperature of the outer peripheral surface S13 on the one end E11 side is defined as, for example, an average temperature of temperatures measured at six positions located at equal intervals along a circumferential direction on an edge portion of the outer peripheral surface S13, which edge portion is at an edge, on the one end E11 side, of a contact region where the outer peripheral surface S13 is in contact with the separator original sheet 12b during drying. Further, the surface temperature of the outer peripheral surface S13 on the other end E12 side is defined as, for example, an average temperature of temperatures measured at six positions located at equal intervals along the circumferential direction on an edge portion of the outer peripheral surface S13, which edge portion is at an edge, on the other end E12 side, of the contact region.

The first cylindrical member 23 and the second cylindrical member 123 are alternately provided along a transfer direction of the separator original sheet 12b so as to be substantially identical in width direction, in such a manner that the one end E1 of the first cylindrical member 23a and the one end E11 of the second cylindrical member 123 are adjacent to each other and the other end E2 of the first cylindrical member 23 and the other end E12 of the second cylindrical member 123 are adjacent to each other.

<Operation of Drying Device 21>

The first cylindrical member 23 and the second cylindrical member 123 are arranged such that the outer peripheral surface S3 of the first cylindrical member 23 and the outer peripheral surface S13 of the second cylindrical member 123 are opposite to each other in thermal distribution along the width direction. In other words, the outer peripheral surface S3 of the first cylindrical member 23 and the outer peripheral surface S13 of the second cylindrical member 123 are arranged to have respective thermal distributions which allow the outer peripheral surfaces S3 and S13 to have respective surface temperatures that are complementary to each other in the width direction.

Accordingly, it is possible to make a total amount of heat (thermal history) applied to the separator original sheet 12b substantially equal at any point along a width direction of the separator original sheet 12b, by putting the separator original sheet 12b in contact alternately with the outer peripheral surface S3 of the first cylindrical member 23 and the outer peripheral surface S13 of the second cylindrical member 123.

In other words, it is possible to apply heat to the separator original sheet 12b so that a total amount of heat thus applied will be substantially equal at any point along the width direction of the separator original sheet 12b (heating step), by alternately carrying out the following operations (i) and (ii) (first sub-step and second sub-step): (i) an operation (first sub-step) to wrap the separator original sheet 12b on the outer peripheral surface S3 of the first cylindrical member 23 having a surface temperature higher on the one end E1 side than the other end E2 side and (ii) an operation (second step) to wrap the separator original sheet 12b on the outer peripheral surface S13 of the first cylindrical member 123 having a surface temperature higher on the other end E12 side than the one end E11 side. This consequently makes it possible to dry the separator original sheet 12b by nearly uniformly heating the separator original sheet 12b.

Note that in Embodiment 1, the second drying roller 122 (second cylindrical member 123) has a configuration obtained by turning, by substantially 180 degrees, an orientation of a widthwise axis of the first drying roller 22 (first cylindrical member 23). Accordingly, the hot water H is supplied to the first cylindrical member 23 and the second cylindrical member 123 from opposite sides, respectively. In this configuration, the outer peripheral surface S3 of the first cylindrical member 23 and the outer peripheral surface S13 of the second cylindrical member 123 are easily arranged to be opposite to each other in thermal distribution along the width direction of each of the first cylindrical member 23 and the second cylindrical member 123.

Further, in a case where each of drying rollers having the same structure is used differently as the first drying roller 22 or the second drying roller 122, the outer peripheral surface S3 of the first cylindrical member 23 and the outer peripheral surface S13 of the second cylindrical member 123 can be easily arranged to have respective thermal distributions which allow the outer peripheral surfaces S3 and S13 to have respective surface temperatures that are complementary to each other in the width direction of each of the first cylindrical member 23 and the second cylindrical, member 123. At the same time, the above case makes it possible to reduce a production cost of the drying device 21.

Note, however, that the outer peripheral surface S3 and the outer peripheral surface S13 only need to have respective thermal distributions which allow the outer peripheral surfaces S3 and S13 to have respective surface temperatures that are complementary to each other in the width direction of each of the first cylindrical member 23 and the second cylindrical member 123, and the first drying roller 22 and the second drying roller 122 can be drying rollers having different structures, respectively (Embodiment 4).

<Effects of Embodiment 1>

As described above, the drying device 21 in accordance with Embodiment 1 includes the first cylindrical member 23 and the second cylindrical member 123, which dry the separator original sheet 12b wrapped on the outer peripheral surfaces S3 and S13 by causing hot water H to flow inside the cylindrical members 23 and 123.

The first cylindrical member 23 and the second cylindrical member 123 are provided alternately along the transfer direction of the separator original sheet 12b. Further, the outer peripheral surface S3 of the first cylindrical member 23 has a higher surface temperature on the one end E1 side than on the other end E2 side, whereas the outer peripheral surface S13 of the second cylindrical member 123 has a higher surface temperature on the other end E12 side than on the one end E11 side.

Further, in the drying device 21, the first cylindrical member 23 and the second cylindrical member 123 are arranged such that the outer peripheral surface S3 and the outer peripheral surface S13 are opposite to each other in thermal distribution along the width direction of each of the first cylindrical member 23 and the second cylindrical member 123. Accordingly, it is possible to make a total amount of heat (thermal history) applied to the separator original sheet 12b substantially equal at any point along the width direction of the separator original sheet 12b, by putting the separator original sheet 12b in contact alternately with the outer peripheral surface S3 of the first cylindrical member 23 and the outer peripheral surface S13 of the second cylindrical member 123.

Therefore, Embodiment 1 makes it possible to provide a drying device 21 capable of drying a separator original sheet 12b by nearly uniformly heating the separator original sheet 12b.

Note that though Embodiment 1 has described an example in which hot water H is discharged from the discharge pipes 24 and 124, an embodiment of the present invention is not limited to this example. The heating medium can alternatively be for example, heated oil, or vapor.

Moreover, though Embodiment 1 has described an example in which the first cylindrical member 23 and the second cylindrical member 123 are alternately provided along the transfer direction of the separator original sheet 12b, an embodiment of the present invention is not limited to this example. The first cylindrical member 23 and the second cylindrical member 123 are not necessarily provided alternately in the order of arrangement or periodically provided, as long as it is possible to make a total amount of heat (thermal history) applied to the separator original sheet 12b substantially equal at any point along the width direction of the separator original sheet 12b.

Further, though Embodiment 1 has described an example in which the number of the first cylindrical member 23 provided in the drying device 21 is equal to the number of the second cylindrical member 123 provided in the drying device 21, an embodiment of the present invention is not limited to this example. The drying device 21 only need to be provided with at least one first cylindrical member 23 and at least one second cylindrical member 123, and in the drying device 21, the number of the first cylindrical member 23 can be arranged to be different from the number of the second cylindrical member 123. Note, however, that in view of making a total amount of heat (thermal history) applied to the separator original sheet 12b substantially equal at any point along the width direction of the separator original sheet 12b, preferably, the number of the first cylindrical member 23 provided in the drying device 21 is equal to the number of the second cylindrical member 123 provided in the drying device 21.

Further, though Embodiment 1 has described an example in which the separator original sheet 12b is dried by the drying device 21, an embodiment of the present invention is not limited to this example. An embodiment of the present invention can be applied to, other than drying of the separator original sheet 12b, drying of a web of belt-like film, paper, cloth, or, a complex or processed material thereof, or the like.

Further, though Embodiment 1 has described an example in which a film heating device in accordance with an embodiment of the present invention is applied to the drying device 21 for drying the separator original sheet 12b, an embodiment of the present invention is not limited to this example. An embodiment of the present invention can be suitably applied to various processes in which a film is heated, for example, processes of reforming, unwrinkling, annealing, and the like of a film, other than drying of a film.

Embodiment 2

The following discusses another embodiment of the present invention, with reference to FIG. 7. Note that for convenience of description, any member having a function identical to that of a member discussed in the foregoing embodiment will be given an identical reference sign, and a description thereof will be omitted.

<Configuration of Drying Device>

(a) of FIG. 7 is a schematic cross sectional view illustrating a configuration of a first drying roller 22a provided in a drying device in accordance with Embodiment 2; and (b) of FIG. 7 is a schematic cross sectional view illustrating a configuration of a second drying roller 122a provided in the drying device.

In the drying device in accordance with Embodiment 2, the first drying roller 22a and the second drying roller 122a are alternately provided along a transfer direction of a separator original sheet 12b.

(First Drying Roller 22a)

The first drying roller 22a includes a first cylindrical member 23a and a discharge pipe 24a. The discharge pipe 24a is provided on one end E1 side of the first cylindrical member 23a, and discharges hot water H toward an inner peripheral surface S4 of the first cylindrical member 23a through a plurality of discharge openings 26a which are formed on an outer peripheral surface of the discharge pipe 24a.

The hot water H discharged through the discharge openings 26a of the discharge pipe 24a toward the inner peripheral surface S4 flows along the inner peripheral surface S4 toward an inner-end-surface S2 side from an inner-end-surface S1 side. Further, the hot water H discharged in a hot state through the discharge openings 26 gradually decreases in temperature, before the hot water H moving along the inner peripheral surface S4 reaches the inner end surface S2. Accordingly, an outer peripheral surface S3 of the first cylindrical member 23a has a relatively high surface temperature on the one end E1 side, and a relatively low temperature on the other end E2 side.

(Second Drying Roller 122a)

The second drying roller 122a includes a second cylindrical member 123a and a discharge pipe 124a. The discharge pipe 124a is provided on an end E12 side (hereinafter, referred to as "the other end E12 side") of the second cylindrical member 123a. The discharge pipe 124a discharges hot water H toward an inner peripheral surface S14 of the second cylindrical member 123a through a plurality of discharge openings 126a which are formed on an outer peripheral surface of the discharge pipe 124a.

The hot water H discharged through the discharge opening 126a of the discharge pipe 124a toward the inner peripheral surface S14 flows along the inner peripheral surface S14 toward an inner-end-surface S11 side from an inner-end-surface S12 side. Further, the hot water H discharged in a hot state through the discharge openings 126a gradually decreases in temperature, before the hot water H moving along the inner peripheral surface S14 reaches the inner end surface S12. Accordingly, the outer peripheral surface S13 of the second cylindrical member 123a has a relatively low surface temperature on one end E11 side, and a relatively high temperature on the other end E12 side.

<Operation of Drying Device>

The first drying roller 22a and the second drying roller 122a are arranged such that the outer peripheral surface S3 of the first cylindrical member 23a and the outer peripheral surface S13 of the second cylindrical member 123a are arranged to have respective thermal distributions which allow the outer peripheral surfaces S3 and S13 to have respective surface temperatures that are complementary to each other in a width direction of each of the first cylindrical member 23a and the second cylindrical member 123a.

Accordingly, it is possible to make a total amount of heat (thermal history) applied to the separator original sheet 12b substantially equal, at any point, along a width direction of the separator original sheet 12b, by putting the separator original sheet 12b in contact alternately with the outer peripheral surface S3 of the first cylindrical member 23a and the outer peripheral surface S13 of the second cylindrical member 123a.

<Effects of Embodiment 2>

As described above, in the drying device in accordance with Embodiment 2, the hot water H supplied from the one end E1 side flows along the inner peripheral surface S4 of the first cylindrical member 23a from the one end E1 side to the other end E2 side, and then ejected from the other end E2 side. Meanwhile, the hot water H supplied from the other end E12 side flows along the inner peripheral surface S14 of the second cylindrical member 123a from the other end E12 side to the one end E11 side, and then ejected from the one end E11 side.

In Embodiment 2, the outer peripheral surface S3 of the first cylindrical member 23a and the outer peripheral surface S13 of the second cylindrical member 123a can be easily arranged to have respective thermal distributions which allow the outer peripheral surfaces S3 and S13 to have respective surface temperatures that are complementary to each other in the width direction of each of the first cylindrical member 23a and the second cylindrical member 123a. At the same time, Embodiment 2 makes it possible to reduce a production cost of a drying device.

Embodiment 3

The following discusses another embodiment of the present invention, with reference to FIG. 8. Note that for convenience of description, any member having a function identical to that of a member discussed in the foregoing embodiment will be given an identical reference sign, and a description thereof will be omitted.

<Configuration of Drying Device>

(a) of FIG. 8 is a schematic cross sectional view illustrating a configuration of a first drying roller 22b provided in a drying device in accordance with Embodiment 3; and (b) of FIG. 8 is a schematic cross sectional view illustrating a configuration of a second drying roller 122b provided in the drying device.

In the drying device in accordance with Embodiment 3, the first drying roller 22b and the second drying roller 122b are alternately provided along a transfer direction of a separator original sheet 12b.

(First Drying Roller 22b)

The first drying roller 22b includes a first cylindrical member 23b. The first cylindrical member 23b has a peripheral wall W1 which is thinner on one end E1 side than on the other end B2 side. This arrangement makes a thermal resistance of the peripheral wall W1 lower on the one end E1 side than on the other end E2 side. Accordingly, it is possible to appropriately control a thermal distribution along a width direction of the first cylindrical member 23b, on an outer peripheral surface S3 of the first cylindrical member 23b so that the outer peripheral surface S3 will have a higher surface temperature on the one end E1 side than on the other end E2 side.

(Second Drying Roller 122b)

The second drying roller 122b includes a second cylindrical member 123b. The second cylindrical member 123b has a peripheral wall W11 which is thicker on one end E11 side than on the other end E12 side. This arrangement makes a thermal resistance of the peripheral wall W11 lower on the other end E12 side than on the one end E11 side. Accordingly, it is possible to appropriately control a thermal distribution on an outer peripheral surface S13 of the second cylindrical member 123b so that the outer peripheral surface S13 will have a higher surface temperature oil the other end E12 side than on the one end E11 side.

<Operation of Drying Device>

The first drying roller 22b and the second drying roller 122b are arranged such that the outer peripheral surface S3 of the first cylindrical member 23b and the outer peripheral surface S13 of the second cylindrical member 123b are arranged to have respective thermal distributions which allow the outer peripheral surfaces S3 and S13 to have respective surface temperatures that are complementary to each other in the width direction of each of the first cylindrical member 23b and the second cylindrical member 123b.

Accordingly, it is possible to make a total amount of heat (thermal history) applied to the separator original sheet 12b substantially equal at any point along a width direction of the separator original sheet 12b, by putting the separator original sheet 12b in contact alternately with the outer peripheral surface S3 of the first cylindrical member 23b and the outer peripheral surface S13 of the second cylindrical member 123b.

<Effects of Embodiment 3>

As described above, in the drying device in accordance with Embodiment 3, the peripheral wall W1 of the first cylindrical member 23b is arranged to be thinner on the one end E1 side than on the other end E2 side, whereas the peripheral wall W11 of the second cylindrical member 123b is arranged to be thinner on the other end E12 side than on the one end E11 side.

In Embodiment 3, in a case where the peripheral wall W1 of the first cylindrical member 23b and the peripheral wall W11 of the second cylindrical member 123b are arranged to have different thicknesses, respectively, it is possible to appropriately control the thermal distribution on the outer peripheral surface S3 of the first cylindrical member 23b and the thermal distribution on the outer peripheral surface S13 of the second cylindrical member 123b so that the outer peripheral surface S3 and the outer peripheral surface S13 will have respective surface temperatures that are complementary to each other in the width direction of each of the first cylindrical member 23b and the second cylindrical member 123b.

Embodiment 4

The following discusses another embodiment of the present invention, with reference to FIG. 9. Note that for convenience of description, any member having a function identical to that of a member discussed in the foregoing embodiment will be given an identical reference sign, and a description thereof will be omitted.

<Configuration of Drying Device>

(a) of FIG. 9 is a schematic cross sectional view illustrating a configuration of a first drying roller 22 provided in a drying device in accordance with Embodiment 4; and (b) of FIG. 9 is a schematic cross sectional view illustrating a configuration of a second drying roller 122a provided in the drying device.

The preceding Embodiments 1 to 3 each have described an example in which drying rollers having an identical structure are caused to function as first drying rollers and second drying rollers, by arranging each drying roller in such a manner that an orientation of a width wise axis of one drying roller is turned by substantially 180 degrees with respect to that of another drying roller adjacent to the one drying roller.

Note that the first drying roller and the second drying roller only need to be arranged such that an outer peripheral surface of a first cylindrical member of the first drying roller and an outer peripheral surface of a second cylindrical member of the second drying roller have respective thermal distributions which allow the outer peripheral surfaces to have respective surface temperatures that are complementary to each other in a width direction of each of the first cylindrical member and the second cylindrical member. Accordingly, it is possible to combine a first drying roller and a second drying roller which have different structures, respectively.

For example, the first drying roller 22 illustrated in (a) of FIG. 6 and the second drying roller 122a illustrated in (b) of FIG. 7 can be alternately provided along a transfer direction of the separator original sheet 12b.

As described above, in the first drying roller 22, hot water H discharged in a hot state through a discharge opening 26 gradually decreases in temperature, before the hot water H moving along an inner peripheral surface S4 from an inner-end-surface S1 side reaches an inner end surface S2. Accordingly, an outer peripheral surface S3 of a first cylindrical member 23 has a relatively high surface temperature on one end E1 side, and a relatively low temperature on the other end E2 side.

Meanwhile, in the second drying roller 122a, hot water H discharged in a hot state through a discharge opening 126a gradually decreases in temperature, before the hot water H moving along an inner peripheral surface S14 reaches an inner end surface S12. Accordingly, an outer peripheral surface S13 of a second cylindrical member 123a has a relatively low surface temperature on one end E11 side, and a relatively high temperature on the other end E12 side.

<Operation of Drying Device>

The first drying roller 22 and the second drying roller 122a are arranged such that the outer peripheral surface S3 of the first cylindrical member 23 and the outer peripheral surface S13 of the second cylindrical member 123a are arranged to have respective thermal distributions which allow the outer peripheral surfaces S3 and S13 to have respective surface temperatures that are complementary to each other in a width direction of each of the first cylindrical member 23 and the second cylindrical member 123a.

Accordingly, it is possible to make a total amount of heat (thermal history) applied to the separator original sheet 12b substantially equal at any point along a width direction of the separator original sheet 12b, by putting the separator original sheet 12b in contact alternately with the outer peripheral surface S3 of the first cylindrical member 23 and the outer peripheral surface S13 of the second cylindrical member 123a.

<Effects of Embodiment 4>

As described above, in the drying device in accordance with Embodiment 4, the hot water H supplied from the other end E2 side and discharged from a discharge pipe 24 flows along the inner peripheral surface S4 of the first cylindrical member 23 from the one end E1 side to the other end E2 side, and then ejected from the other end E2 side. Meanwhile, the hot water H supplied from the other end E12 side flows along the inner peripheral surface S14 of the second cylindrical member 123a from the other end E12 side to the one end E11 side, and then ejected from the one end E11 side.

In Embodiment 4, the hot water H is supplied to the first cylindrical member 23 and the second cylindrical member 123a from one side (the other end E1 or E11 side). This makes it possible to simplify a structure for supply of the hot water to the first cylindrical member 23 and the second cylindrical member 123a.

The present invention is not limited to the above-described embodiments, but can be altered by a skilled person in the art within the scope of the claims. An embodiment derived from a proper combination of technical means each disclosed in a different embodiment is also encompassed in the technical scope of the present invention.

In order to solve the above problem, a film heating device in accordance with an embodiment of the present invention includes: a first cylindrical member; and a second cylindrical member, the first cylindrical member and the second cylindrical member each causing a heating medium to flow inside the first cylindrical member or the second cylindrical member, so as to heat a film wrapped on an outer peripheral surface of the first cylindrical member or the second cylindrical member, the first cylindrical member and the second cylindrical member being provided along a transfer direction of the film so as to be substantially identical in width direction, the first cylindrical member having an outer peripheral surface and two first ends in the width direction, the outer peripheral surface having a higher surface temperature on one first-end side that is a side corresponding to one end of the first cylindrical member in the width direction, than on the other first-end side that is another side corresponding to the other end of the first cylindrical member in the width direction, and the second cylindrical member having an outer peripheral surface and two second ends in the width direction, the outer peripheral surface having a lower surface temperature on one second-end side that is the side corresponding to the one end of the second cylindrical member in the width direction, than on the other second-end side that is the another side corresponding to the other end of the second cylindrical member in the width direction.

In the above configuration, the outer peripheral surface of the first cylindrical member and the outer peripheral surface of the second cylindrical member are opposite to each other in thermal distribution along the width direction. In other words, the outer peripheral surface of the first cylindrical member and the outer peripheral surface of the second cylindrical member have respective thermal distributions which allow the outer peripheral surfaces to have temperatures that are complementary to each other in the width direction. Accordingly, it is possible to make a total amount of heat (thermal history) applied to the film substantially equal at any point along the width direction, by causing the film to come in contact with the outer peripheral surface of the first cylindrical member and the outer peripheral surface of the second cylindrical member.

Therefore, the above configuration makes it possible to provide a film heating device capable of nearly uniformly heating a film.

Further, a film heating device in accordance with an embodiment of the present invention can be arranged such that: the first cylindrical member is plurally provided; the second cylindrical member is pin rally provided; and the first cylindrical member and the second cylindrical member are alternately provided.

The above configuration causes the film to come in contact alternately with the first cylindrical member and the second cylindrical member. This not only improves heating efficiency but also easily makes a total amount of heat (thermal history) applied to the film substantially equal at any point along the width direction.

Further, a film heating device in accordance with an embodiment of the present, invention can be arranged such that: after having been supplied from the other first-end side and discharged from a first discharge pipe on the one first-end side, the heating medium flows along an inner peripheral surface of the first cylindrical member from the one first-end side to the other first-end side and is subsequently discharged from the other first-end side; and after having been supplied from the one second-end side and discharged from a second discharge pipe on the other second-end side, the heating medium flows along an inner peripheral surface of the second cylindrical member from the other second-end side to the one second-end side and is subsequently discharged from the one second-end side.

In the above configuration, cylindrical members having an identical structure are used as the first cylindrical member and the second cylindrical member, respectively, by turning by substantially 180 degrees an orientation of a widthwise axis of one of the cylindrical members with respect to that of another one of the cylindrical members.

Therefore, the above configuration makes it easy to arrange respective thermal distributions of the outer peripheral surface of the first cylindrical member and the outer peripheral surface of the second cylindrical member in such a manner that the outer peripheral surfaces have respective surface temperatures that are complementary to each other in the width direction. At the same time, the above configuration makes it possible to reduce a production cost of the film heating device.

Further, a film heating device in accordance with an embodiment of the present invention can be arranged such that: after having been supplied from the one first-end side, the heating medium flows along an inner peripheral surface of the first cylindrical member from the one first-end side to the other first-end side, and is subsequently discharged from the other first-end side; and after having been supplied from the other second-end side, the heating medium flows along an inner peripheral surface of the second cylindrical member from the other second-end side to the one second-end side and is subsequently discharged from the one second-end side.

In the above configuration, cylindrical members having an identical structure are used as the first cylindrical member and the second cylindrical member, respectively, by turning by substantially 180 degrees an orientation of a width wise axis of one of the cylindrical members with respect to that of another one of the cylindrical members.

Therefore, the above configuration makes it easy to arrange respective thermal distributions of the outer peripheral surface of the first cylindrical member and the outer peripheral surface of the second cylindrical member in such a manner that the outer peripheral surfaces have respective surface temperatures that are complementary to each other in the width direction. At the same time, the above configuration makes it possible to reduce a production cost of the film heating device.

Further, a film heating device in accordance with an embodiment of the present invention can be arranged such that: after having been supplied from the other first-end side and discharged from a first discharge pipe on the one first-end side, the heating medium flows along an inner peripheral surface of the first cylindrical member from the one first-end side to the other first-end side and is subsequently discharged from the other first-end side; and after having been supplied from the other second-end side, the heating medium flows along an inner peripheral surface of the second cylindrical member from the other second-end side to the one second-end side and is subsequently discharged from the one second-end side.

In the above configuration, the heating medium is supplied to the first cylindrical member and the second cylindrical member from one side (the other end side).

Accordingly, the above configuration makes it possible to simplify a structure for supply of the heating medium to the first cylindrical member and the second cylindrical member.

Further, a film heating device in accordance with an embodiment of the present invention can be arranged such that: the first cylindrical member has a peripheral wall which is thinner on the one first-end side than on the other first-end side; and the second cylindrical member has a peripheral wall which is thinner on the other second-end side than on the one second-end side.

In the above configuration, the peripheral wall of the first cylindrical member is arranged to be thinner on the one first-end side than the other first-end side, so that a thermal resistance of the peripheral wall is lower on the one first-end side than on the other first-end side. Accordingly, it is possible to appropriately control the thermal distribution along the width direction on the outer peripheral surface of the first cylindrical member so that the outer peripheral surface will have a higher surface temperature on the one first-end side than on the other first-end side.

Similarly, the peripheral wall of the second cylindrical member is arranged to be thinner on the other second-end side than the one second-end side, so that a thermal resistance of the peripheral wall is lower on the other second-end side than on the one second-end side. Accordingly, it is possible to appropriately control the thermal distribution along the width direction on the outer peripheral surface of the second cylindrical member so that the outer peripheral surface will have a higher surface temperature on the other second-end side than on the one second-end side.

Accordingly, in the above configuration, in a case where the peripheral wall of the first cylindrical member and the peripheral wall of the second cylindrical member are arranged to have different thicknesses, respectively, it is possible to appropriately control the thermal distribution on the outer peripheral surface of the first cylindrical member and the thermal distribution on the outer peripheral surface of the second cylindrical member so that the outer peripheral surfaces of the first cylindrical member and the second cylindrical member will have respective surface temperatures that are complementary to each other in the width direction.

In order to solve the above problem, a film heating device in accordance with an embodiment of the present invention includes: a first cylindrical member; and a second cylindrical member, the first cylindrical member and the second cylindrical member each causing a heating medium to flow inside the first cylindrical member or the second cylindrical member, so as to heat a film wrapped on an outer peripheral surface of the first cylindrical member or the second cylindrical member, the first cylindrical member and the second cylindrical member being provided along a transfer direction of the film so as to be substantially identical in width direction, the first cylindrical member being supplied with the heating medium from a side corresponding to one end of the first cylindrical member in the width direction, and the second cylindrical member having two ends which include one end on the side corresponding to the one end of the first cylindrical member in the width direction and the other end on another side opposite to the one side in the width direction, the second cylindrical member being supplied with the heating medium from the another side corresponding to the other end.

In the above configuration, since the heating medium is supplied to the first cylindrical member and the second cylindrical member from different sides, respectively, the outer peripheral surface of the first cylindrical member and the outer peripheral surface of the second cylindrical member are easily arranged to be opposite to each other in thermal distribution along the width direction. Accordingly, it is possible to make a total amount of heat (thermal history) applied to the film substantially equal at any point along the width direction, by causing the film to come in contact with the outer peripheral surface of the first cylindrical member and the outer peripheral surface of the second cylindrical member.

Therefore, the above configuration makes it possible to provide a film heating device capable of nearly uniformly heating a film.

In order to solve the above problem, a film production method in accordance with an embodiment of the present invention includes the step of heating a film by use of a first cylindrical member and a second cylindrical member, each of which causes a heating medium to flow inside the first cylindrical member or the second cylindrical member so as to heat the film wrapped on an outer peripheral surface of the first cylindrical member or the second cylindrical member, the first cylindrical member and the second cylindrical member being provided so as to be substantially identical in width direction, the heating step including: a first sub-step of wrapping the film on the outer peripheral surface of the first cylindrical member, which has a higher surface temperature on one first-end side that is a side corresponding to one end of the first cylindrical member in the width direction, than on another first-end side that is another side corresponding to the other end of the first cylindrical member in the width direction; and a second sub-step of wrapping the film on the outer peripheral surface of the second cylindrical member, the second cylindrical member having two ends which include one end on the side corresponding to the one end of the first cylindrical member in the width direction and the other end on the another side corresponding to the other end of the first cylindrical member in the width direction, the second cylindrical member having a lower surface temperature on one second-end side that is a side corresponding to the one end of the second cylindrical member in the width direction, than on another second-end side that is another side corresponding to the other end of the second cylindrical member in the width direction.

In the above method, the outer peripheral surface of the first cylindrical member and the outer peripheral surface of the second cylindrical member are opposite to each other in thermal distribution along the width direction. In other words, the outer peripheral surface of the first cylindrical member and the outer peripheral surface of the second cylindrical member have respective thermal distributions which allow the outer peripheral surfaces to have surface temperatures that are complementary to each other in the width direction. Accordingly, it is possible to make a total amount of heat (thermal history) applied to the film substantially equal at any point along the width direction, by carrying out the first sub-step and the second sub-step.

Therefore, the above method makes it possible to provide a film production method that makes it possible to nearly uniformly heating a film in the step of heating.

In order to solve the above problem, a film production method in accordance with an embodiment of the present invention includes the step of heating a film by use of a first cylindrical member and a second cylindrical member, each of which causes a heating medium to flow inside the first cylindrical member or the second cylindrical member so as to heat the film wrapped on an outer peripheral surface of the first cylindrical member or the second cylindrical member, the first cylindrical member and the second cylindrical member being provided so as to be substantially identical in width direction, the heating step including: a first sub-step of wrapping the film on the outer peripheral surface of the first cylindrical member, which is supplied with the heating medium from a side corresponding to one end of the first cylindrical member in the width direction; and a second sub-step of wrapping the film on the outer peripheral surface of the second cylindrical member, the second cylindrical member having two ends which include one end on the side corresponding to the one end of the first cylindrical member in the width direction and the other end on another side opposite to the one side in the width direction, the second cylindrical member being supplied with the heating medium from the another side corresponding to the other end.

In the above method, since the heating medium is supplied to the first cylindrical member and the second cylindrical member from different sides, respectively, the outer peripheral surface of the first cylindrical member and the outer peripheral surface of the second cylindrical member are easily arranged to be opposite to each other in thermal distribution along the width direction. Accordingly, it is possible to make a total amount of heat (thermal history) applied to the film substantially equal at any point along the width direction, by carrying out the first sub-step and the second sub-step.

Therefore, the above method makes it possible to provide a film production method that makes it possible to nearly uniformly heating a film in the step of heating.

REFERENCE SIGNS LIST 12b separator original sheet (film)
21 drying device (film heating device)
23, 23a, 23b first cylindrical member
24, 24a discharge pipe (first discharge pipe)
123, 123a, 123b second cylindrical member
124, 124a discharge pipe (second discharge pipe)
E1 one end (one first end)
E2 the other end (the other first end)
E11 one end (one second end)
E12 the other end (the other second end)
H hot water (heating medium)

The invention claimed is:

1. A nonaqueous electrolyte secondary battery separator production method comprising the step of heating a nonaqueous electrolyte secondary battery separator uniformly by use of a first cylindrical member and a second cylindrical member, each of which causes a heating medium to flow inside the first cylindrical member or the second cylindrical member so as to heat the nonaqueous electrolyte secondary battery separator wrapped on an outer peripheral surface of the first cylindrical member or the second cylindrical member, the first cylindrical member and the second cylindrical member being provided so as to be substantially identical in width direction, the heating step including:
a first sub-step of wrapping the nonaqueous electrolyte secondary battery separator on the outer peripheral surface of the first cylindrical member, which has a higher surface temperature on one first-end side that is a side corresponding to one end of the first cylindrical member in the width direction, than on the other first-end side that is the other side corresponding to the other end of the first cylindrical member in the width direction; and
a second sub-step of wrapping the nonaqueous electrolyte secondary battery separator on the outer peripheral surface of the second cylindrical member, the second cylindrical member having two ends which include one end on the side corresponding to the one end of the first cylindrical member in the width direction and the other end on the other side corresponding to the other end of the first cylindrical member in the width direction, the second cylindrical member having a lower surface temperature on one second-end side that is a side corresponding to the one end of the second cylindrical member in the width direction, than on the other second-end side that is the other side corresponding to the other end of the second cylindrical member in the width direction,
wherein the wrapping of the nonaqueous electrolyte secondary battery separator on the outer peripheral surfaces of the first and the second cylindrical members is performed while there is no shifting of the first and second cylindrical members in an axial direction relative to each other.

2. The nonaqueous electrolyte secondary battery separator production method as set forth in claim 1, wherein:
in the heating step, the first sub-step is performed plural times and the second sub-step is performed plural times; and
the first sub-step and the second sub-step are performed so as to make a total amount of heat applied to the nonaqueous electrolyte secondary battery separator substantially equal at any point along an width direction of the nonaqueous electrolyte secondary battery separator.

3. The nonaqueous electrolyte secondary battery separator production method as set forth in claim 2, wherein:
the first sub-step and the second sub-step are performed alternately.

4. The nonaqueous electrolyte secondary battery separator production method as set forth in claim 2, wherein:
in the heating step,
after having been supplied from the other first-end side and discharged from a first discharge pipe on the one first-end side, the heating medium flows along an inner peripheral surface of the first cylindrical member from the one first-end side to the other first-end side and is subsequently discharged from the other first-end side; and
after having been supplied from the one second-end side and discharged from a second discharge pipe on the other second-end side, the heating medium flows along an inner peripheral surface of the second cylindrical member from the other second-end side to the one second-end side and is subsequently discharged from the one second-end side.

5. The nonaqueous electrolyte secondary battery separator production method as set forth in claim 4, wherein:
the heating medium is discharged from the first discharge pipe toward the one first-end side; and
the heating medium is discharged from the second discharge pipe toward the other second-end side.

6. The nonaqueous electrolyte secondary battery separator production method as set forth in claim 2, wherein:
in the heating step,
after having been supplied from the one first-end side, the heating medium flows along an inner peripheral surface of the first cylindrical member from the one first-end side to the other first-end side, and is subsequently discharged from the other first-end side; and
after having been supplied from the other second-end side, the heating medium flows along an inner peripheral surface of the second cylindrical member from the other second-end side to the one second-end side and is subsequently discharged from the one second-end side.

7. The nonaqueous electrolyte secondary battery separator production method as set forth in claim 6, wherein:
the heating medium is discharged from the first discharge pipe on the one first-end side toward the inner peripheral surface of the first cylindrical member; and
the heating medium is discharged from the second discharge pipe on the other second-end side toward the inner peripheral surface of the second cylindrical member.

8. The nonaqueous electrolyte secondary battery separator production method as set forth in claim 2, wherein:
in the heating step,
after having been supplied from the other first-end side and discharged from a first discharge pipe on the one first-end side, the heating medium flows along an inner peripheral surface of the first cylindrical member from the one first-end side to the other first-end side and is subsequently discharged from the other first-end side; and
after having been supplied from the other second-end side, the heating medium flows along an inner peripheral surface of the second cylindrical member from the other second-end side to the one second-end side and is subsequently discharged from the one second-end side.

9. The nonaqueous electrolyte secondary battery separator production method as set forth in claim 2, wherein:
the first cylindrical member and the second cylindrical member are cylindrical members having an identical structure; and
each of the cylindrical members is positioned in such a manner as to be turned substantially by 180 degrees in width direction of said each of the cylindrical members.

10. The nonaqueous electrolyte secondary battery separator production method as set forth in claim 1, wherein:
in the heating step,
after having been supplied from the other first-end side and discharged from a first discharge pipe on the one first-end side, the heating medium flows along an inner peripheral surface of the first cylindrical member from the one first-end side to the other first-end side and is subsequently discharged from the other first-end side; and
after having been supplied from the one second-end side and discharged from a second discharge pipe on the other second-end side, the heating medium flows along an inner peripheral surface of the second cylindrical member from the other second-end side to the one second-end side and is subsequently discharged from the one second-end side.

11. The nonaqueous electrolyte secondary battery separator production method as set forth in claim 10, wherein:
the heating medium is discharged from the first discharge pipe toward the one first-end side; and
the heating medium is discharged from the second discharge pipe toward the other second-end side.

12. The nonaqueous electrolyte secondary battery separator production method as set forth in claim 1, wherein:
in the heating step,
after having been supplied from the one first-end side, the heating medium flows along an inner peripheral surface of the first cylindrical member from the one first-end side to the other first-end side, and is subsequently discharged from the other first-end side; and
after having been supplied from the other second-end side, the heating medium flows along an inner peripheral surface of the second cylindrical member from the other second-end side to the one second-end side and is subsequently discharged from the one second-end side.

13. The nonaqueous electrolyte secondary battery separator production method as set forth in claim 12, wherein:
the heating medium is discharged from the first discharge pipe on the one first-end side toward the inner peripheral surface of the first cylindrical member; and
the heating medium is discharged from the second discharge pipe on the other second-end side toward the inner peripheral surface of the second cylindrical member.

14. The nonaqueous electrolyte secondary battery separator production method as set forth in claim 1, wherein:
in the heating step,
after having been supplied from the other first-end side and discharged from a first discharge pipe on the one first-end side, the heating medium flows along an inner peripheral surface of the first cylindrical member from the one first-end side to the other first-end side and is subsequently discharged from the other first-end side; and
after having been supplied from the other second-end side, the heating medium flows along an inner peripheral surface of the second cylindrical member from the other second-end side to the one second-end side and is subsequently discharged from the one second-end side.

15. The nonaqueous electrolyte secondary battery separator production method as set forth in claim 1, wherein:
the first cylindrical member and the second cylindrical member are cylindrical members having an identical structure; and
each of the cylindrical members is positioned in such a manner as to be turned substantially by 180 degrees in width direction of said each of the cylindrical members.

16. A nonaqueous electrolyte secondary battery separator production method comprising the step of heating a nonaqueous electrolyte secondary battery separator uniformly by use of a first cylindrical member and a second cylindrical member, each of which causes a heating medium to flow inside the first cylindrical member or the second cylindrical member so as to heat the nonaqueous electrolyte secondary battery separator wrapped on an outer peripheral surface of the first cylindrical member or the second cylindrical member, the first cylindrical member and the second cylindrical member being provided so as to be substantially identical in width direction,
the heating step including:
a first sub-step of wrapping the nonaqueous electrolyte secondary battery separator on the outer peripheral surface of the first cylindrical member, which is supplied with the heating medium from a side corresponding to one end of the first cylindrical member in the width direction; and
a second sub-step of wrapping the nonaqueous electrolyte secondary battery separator on the outer peripheral surface of the second cylindrical member, the second cylindrical member having two ends which include one end on the side corresponding to the one end of the first cylindrical member in the width direction and the other end on the other side opposite to the one side in the width direction, the second cylindrical member being supplied with the heating medium from the other side corresponding to the other end,
wherein the wrapping of the nonaqueous electrolyte secondary battery separator on the outer peripheral surfaces of the first and the second cylindrical members is performed while there is no shifting of the first and second cylindrical members in an axial direction relative to each other.

17. A nonaqueous electrolyte secondary battery separator production method comprising the step of heating a nonaqueous electrolyte secondary battery separator by use of a first cylindrical member and a second cylindrical member, each of which causes a heating medium to flow inside the first cylindrical member or the second cylindrical member so as to heat the nonaqueous electrolyte secondary battery separator wrapped on an outer peripheral surface of the first cylindrical member or the second cylindrical member, the first cylindrical member and the second cylindrical member being provided so as to be substantially identical in width direction, wherein the first cylindrical member has a first end and a second end in the width direction and the second cylindrical member has a first end and a second end in the width direction,
the heating step including:
a first sub-step of wrapping the nonaqueous electrolyte secondary battery separator on the outer peripheral surface of the first cylindrical member, which has a higher surface temperature on the first end than on the second end; and a second sub-step of wrapping the nonaqueous electrolyte secondary battery separator on the outer peripheral surface of the second cylindrical member, the second cylindrical member having a lower surface temperature on the first end than on the second end;

wherein the first end of the first cylindrical member and the first end of the second cylindrical member are proximate to a first edge of the separator;

wherein the first cylindrical member has a peripheral wall which is thinner on the first end than on the second end; and the second cylindrical member has a peripheral wall which is thinner on the second end than on the first end.

18. A nonaqueous electrolyte secondary battery separator production method comprising the step of heating a nonaqueous electrolyte secondary battery separator by use of a first cylindrical member and a second cylindrical member, each of which causes a heating medium to flow inside the first cylindrical member or the second cylindrical member so as to heat the nonaqueous electrolyte secondary battery separator wrapped on an outer peripheral surface of the first cylindrical member or the second cylindrical member, the first cylindrical member and the second cylindrical member being provided so as to be substantially identical in width direction, wherein the first cylindrical member has a first end and a second end in the width direction and the second cylindrical member has a first end and a second end in the width direction, the heating step including:
a first sub-step of wrapping the nonaqueous electrolyte secondary battery separator on the outer peripheral surface of the first cylindrical member, which has a higher surface temperature on the first end than on the second end; and a second sub-step of wrapping the nonaqueous electrolyte secondary battery separator on the outer peripheral surface of the second cylindrical member, the second cylindrical member having a lower surface temperature on the first end than on the second end;

wherein the first end of the first cylindrical member and the first end of the second cylindrical member are proximate to a first edge of the separator, wherein in the heating step, the first sub-step is performed plural times and the second sub-step is performed plural times; and the first sub-step and the second sub-step are performed so as to make a total amount of heat applied to the nonaqueous electrolyte secondary battery separator substantially equal at any point along a width direction of the nonaqueous electrolyte secondary battery separator;

wherein the first cylindrical member has a peripheral wall which is thinner on the first end than on the second end; and the second cylindrical member has a peripheral wall which is thinner on the second end than on the first end.

19. A nonaqueous electrolyte secondary battery separator production method comprising the step of heating a nonaqueous electrolyte secondary battery separator by use of a first cylindrical member and a second cylindrical member, each of which causes a heating medium to flow inside the first cylindrical member or the second cylindrical member so as to heat the nonaqueous electrolyte secondary battery separator wrapped on an outer peripheral surface of the first cylindrical member or the second cylindrical member, the first cylindrical member and the second cylindrical member being provided so as to be substantially identical in width direction, the heating step including:
a first sub-step of wrapping the nonaqueous electrolyte secondary battery separator on the outer peripheral surface of the first cylindrical member, which has a higher surface temperature on one first-end side that is a side corresponding to one end of the first cylindrical member in the width direction, than on the other first-end side that is the other side corresponding to the other end of the first cylindrical member in the width direction; and a second sub-step of wrapping the nonaqueous electrolyte secondary battery separator on the outer peripheral surface of the second cylindrical member, the second cylindrical member having two ends which include one end on the side corresponding to the one end of the first cylindrical member in the width direction and the other end on the other side corresponding to the other end of the first cylindrical member in the width direction, the second cylindrical member having a lower surface temperature on one second-end side that is a side corresponding to the one end of the second cylindrical member in the width direction, than on the other second-end side that is the other side corresponding to the other end of the second cylindrical member in the width direction, wherein the first cylindrical member and the second cylindrical member are cylindrical members having different structures.

20. A nonaqueous electrolyte secondary battery separator production method comprising the step of heating a nonaqueous electrolyte secondary battery separator by use of a first cylindrical member and a second cylindrical member, each of which causes a heating medium to flow inside the first cylindrical member or the second cylindrical member so as to heat the nonaqueous electrolyte secondary battery separator wrapped on an outer peripheral surface of the first cylindrical member or the second cylindrical member, the first cylindrical member and the second cylindrical member being provided so as to be substantially identical in width direction, the heating step including:
a first sub-step of wrapping the nonaqueous electrolyte secondary battery separator on the outer peripheral surface of the first cylindrical member, which has a higher surface temperature on one first-end side that is a side corresponding to one end of the first cylindrical member in the width direction, than on the other first-end side that is the other side corresponding to the other end of the first cylindrical member in the width direction; and a second sub-step of wrapping the nonaqueous electrolyte secondary battery separator on the outer peripheral surface of the second cylindrical member, the second cylindrical member having two ends which include one end on the side corresponding to the one end of the first cylindrical member in the width direction and the other end on the other side corresponding to the other end of the first cylindrical member in the width direction, the second cylindrical member having a lower surface temperature on one second-end side that is a side corresponding to the one end of the second cylindrical member in the width direction, than on the other second-end side that is the other side corresponding to the other end of the second cylindrical member in the width direction;

wherein in the heating step, the first sub-step is performed plural times and the second sub-step is performed plural times; and the first sub-step and the second sub-step are performed so as to make a total amount of heat applied to the nonaqueous electrolyte secondary battery separator substantially equal at any point along an width direction of the nonaqueous electrolyte secondary battery separator, and wherein the first cylindrical member and the second cylindrical member are cylindrical members having different structures, wherein the first cylindrical member and the second cylindrical member are cylindrical members having different structures.

* * * * *